Sept. 22, 1959  W. G. HITCHNER  2,905,321
METHOD AND APPARATUS FOR INSPECTING GLASS SPHERES
Filed Aug. 12, 1957

INVENTOR.
WILLIAM G. HITCHNER
BY W. A. Schaich &
E. J. Holler
ATTORNEYS

United States Patent Office 2,905,321
Patented Sept. 22, 1959

2,905,321

METHOD AND APPARATUS FOR INSPECTING GLASS SPHERES

William G. Hitchner, Vineland, N.J., assignor to Kimble Glass Company, a corporation of Ohio Application August 12, 1957, Serial No. 677,568

6 Claims. (Cl. 209—115)

The present invention relates to inspecting glass articles such as glass beads, spheres, or marbles and more particularly to subjecting glass spherules to a controlled shock test to effect the separation of acceptable from unacceptable articles.

In present-day manufacturing of glass beads, for example, such as employed in distillation columns for packing, it has been a problem to furnish the spherical glass articles all having the same high degree of strength. Some glass beads are produced having so-called "tails" which destroy their purely spherical contour. Normally, such misshapen beads may be separated from the more nearly spherical by screening the beads through separation screens having openings of proper dimensions. Along with the above problem of some of the beads being slightly misshapen, another inherent defect is that some beads may have small internal cracks or fissures therein which greatly reduce their overall strength. These weaker beads cannot be separated from solid spheres of the same general diameter by screening and frequently tend to break while in use due to mechanical or thermal shock, such as when employed in a distillation column. It is important in producing high quantity glass spheres or beads that these inherently weak articles be completely eliminated to prevent their breakage in use, since fragments of the articles may contaminate prepared solutions. Separation of the cracked from the solid spheres has heretofore been accomplished by laborious hand-picking methods which are neither practical nor efficient for producing large quantites of the spheres. Naturally, because of the relatively small sizes involved, a considerable number are necessary to occupy a given volume and furnish a specific surface area, particularly in industrial or scientific equipment where the spheres or beads may be utilized as packing or a heat-exchanging medium.

Accordingly, it is an object of the present invention to furnish an improved method of inspecting spherical glass articles by subjecting the same to a regulated, relatively uniform impact sufficient to at least partially destroy the faulty unacceptable articles without affecting the acceptable.

Another object of the present invention is to provide a simple and expedient method of inspecting and separating glass spherules by subjecting the same to a controlled dead-plate impact in an impacting device capable of handling large quantities of the articles to thereby accomplish a separation of the acceptable and unacceptable articles.

Another object of the present invention is to provide a novel apparatus for inspecting glass spheres comprising a multiple-barreled air gun capable of shooting the spheres at an impact plate with relatively uniform force to at least partially destroy the faulty articles and permitting the acceptable spheres to separate by gravity.

The specific nature of this invention, as well as other objects and advantages thereof, will become apparent to those skilled in the art from the following detailed description, taken in conjunction with the annexed sheet of drawings on which, by way of preferred example only, is illustrated one embodiment of this invention.

The invention as described hereinafter is generally referred to as applicable to inspecting glass beads, spheres, or spherules of varied sizes, but it is also contemplated that the invention may be equally applicable to inspecting glass articles which are smoothly contoured and not precisely spherical in configuration.

Figure 1:
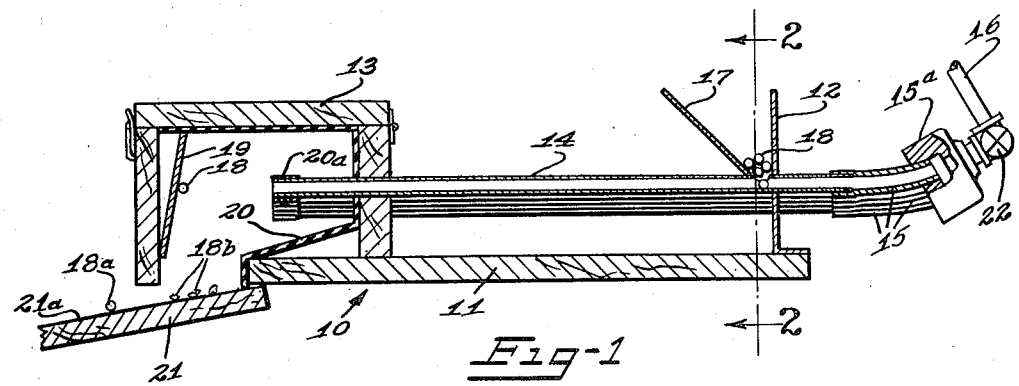
Fig. 1 is a vertical sectional view showing the inspecting apparatus embodying the present invention.
Figure 2:
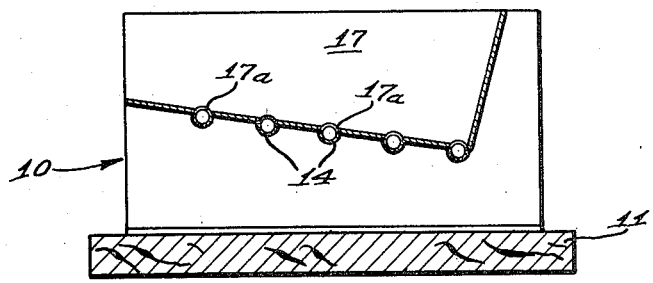
Fig. 2 is a vertical sectional view taken along the line 2—2 of Fig. 1.
Figure 3:
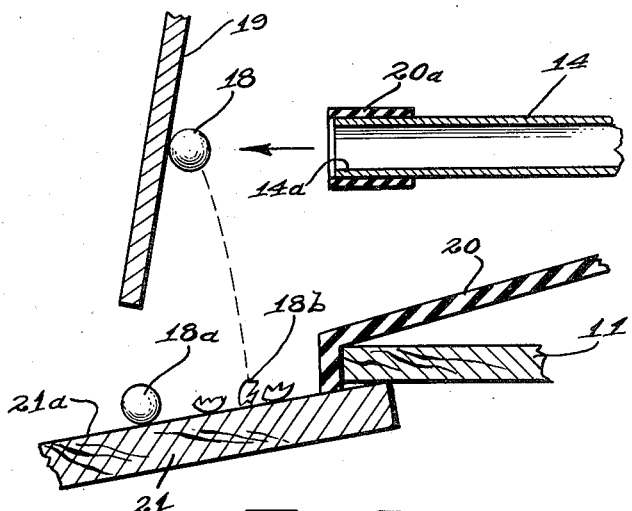
Fig. 3 is an enlarged fragmentary view of one portion of Fig. 1.

Referring now to the drawings and particularly Fig. 1, the inspecting apparatus 10 is shown having a base plate 11, an upright member 12 at one end thereof, and a hollow rectangular chamber 13 at the other end. Interconnecting upright member 12 and hollow chamber 13 are a series of horizontally disposed tubes 14 which comprise the barrels of a multiple-barreled air gun. Tubes 14 are mounted in spaced-apart, equidistant parallel relationship in a flat plane slightly sloping from horizontal. To the open ends of tubes 14 extending beyond upright member 12 are attached individual air lines 15 to each of the tubes, which lines merge into air manifold 15a. Pressurized air may be supplied to manifold 15a and tubes 14 from a connecting air line 16 having a constant pressure regulating valve 22 therein.

A trough 17 is mounted adjacent upright member 12 over tubes 14. The upper portion of member 12 forms a sidewall of trough 17 which is adaptable to containment of glass spheres 18. Trough 17 has a sloping bottom and a series of slotted openings 17a in approximately the same plane as the tube axes, one opening leading into each tube 14. Trough openings 17a are of sufficient size to permit glass spheres 18 to be individually fed into tubes 14 by gravity.

The muzzle ends 14a of the tubes are centrally disposed within hollow chamber 13 facing a solid striking plate 19. Plate 19 serves as an impact plate against which spheres 18 impinge upon their discharge from the air-gun barrels. The interior of chamber 13 is lined with a resilient material such as sheet rubber to minimize secondary impacting of the spheres 18 and possible destruction of solid spheres. The muzzle end 14a of each tube is covered with a short sleeve 20a of similar resilient material to prevent damage to acceptable spheres flying back and striking the tube ends.

An opening 13a is provided in chamber 13 immediately below striking plate 19 for discharging the impacted glass spheres 18a and 18b from the impacting device. The solid acceptable spheres 18a drop down upon an inclined surface 21a of sloping member 21 and freely roll down the sloping surface by gravity. The partially or completely destroyed spheres 18b which are fragmented, halved, or chipped by the impact also drop onto the inclined surface and remain in place due to their inability to roll. Periodically the fragments of faulty spheres 18b are swept aside to allow the acceptable spheres 18a to freely roll down the separating surface 21a to a collection station at its bottom.

The apparatus preferably consists of a series of two or more tubes about 16″ in length. The tubes may have an inside diameter of 5/16″ for utilization in inspecting various sizes of spherules from 3 to 6 millimeters diameter. The impact plate preferably consists of a hardened steel plate placed about two or three inches from the discharge end of the tubes and at a slight downwardly facing angle from vertical. The muzzle enclosing chamber 13 serves to prevent the spherules from ricocheting about after impact and the opening in its bottom permits the glass spheres to freely drop onto the separation table.

It has been found that to satisfactorily operate the described apparatus for inspecting 3 to 6 mm. spherules, pressurized air at about 6 lbs. per sq. in. is passed through the tubes. A substantial quantity of the spherules are placed into the trough or chute which automatically feeds them through the bottom slots and into the tubes. The air stream forcibly blows the spherules against the hardened steel plate with controlled force due to the uniform air velocity through the tubes breaking open the cracked or defective spherules without adversely affecting the acceptable solid ones. Both the broken and solid beads then drop onto the sorting or separation table for gravity separation.

Various modifications may be resorted to within the spirit and scope of the appended claims.

I claim:

1. The method of inspecting glass articles such as glass spheres which comprises the steps of introducing the glass articles into an impacting device, impacting said glass articles against a dead plate with more than gravitational force to effect at least a partial destruction of the unacceptable articles and of insufficient force to adversely affect the acceptable articles, and separating the acceptable from the unacceptable articles by rolling movement thereof.

2. The method of inspecting glass spheres which comprises the steps of introducing the glass spheres into an impacting device, impacting said glass spheres against a dead plate with sufficient force to effect a partial destruction of the unacceptable spheres only, and allowing the acceptable spheres to separate by gravity on an inclined surface.

3. The method of separating defective from solid glass spheres which comprises the steps of introducing the glass spheres into an air-operated impacting device, shooting said glass spheres from said impacting device to impinge a solid striking surface, controlling the striking force of said glass spheres to effect at least a partial destruction of the defective spheres only, and permitting the unaffected solid glass spheres to roll down an inclined surface.

4. The method of separating defective from acceptable glass spheres which comprises the steps of introducing the glass spheres into multiple-barreled air gun, shooting said glass spheres from said air gun to impact a solid striking plate, impacting said spheres against said plate in an enclosed chamber with sufficient kinetic energy to fracture at least partially the defective spheres only, and allowing the impact-resistant acceptable glass spheres to freely roll down an inclined surface disposed immediately below said striking plate for collection.

5. In an apparatus for inspecting glass spheres, the combination comprising a non-explosive air gun having a plurality of fixed barrels, a hollow chamber enclosing the muzzle ends of said barrels, pressurized fluid lines connected to the other ends of each of said barrels, a filling trough having an opening into each of said barrels for feeding the glass articles thereinto, a fixed striking surface mounted within said hollow chamber disposed oppositely and angularly a uniform distance from the muzzle ends of said barrels, said chamber having a bottom opening immediately below said striking surface, and an inclined surface beneath said bottom opening for gravity separation of the impacted glass articles.

6. The combination in accordance with claim 5, including a resilient lining over the inner surfaces of said hollow chamber to minimize secondary impingement of said impacted glass articles.

References Cited in the file of this patent

UNITED STATES PATENTS

| 700,879 | Woolfe | May 27, 1902 |
| 1,743,576 | Smith | Jan. 14, 1930 |
| 2,607,482 | Weisz | Aug. 19, 1952 |